(12) United States Patent
Lim

(10) Patent No.: US 7,869,806 B2
(45) Date of Patent: Jan. 11, 2011

(54) METHOD AND APPARATUS FOR SAVING POWER OF MULTI STANDBY MOBILE TERMINAL

(75) Inventor: Nam Kyu Lim, Seoul (KR)

(73) Assignee: Samsung Electronics Co., Ltd (KR)

( * ) Notice: Subject to any disclaimer, the term of this patent is extended or adjusted under 35 U.S.C. 154(b) by 632 days.

(21) Appl. No.: 11/775,754

(22) Filed: Jul. 10, 2007

(65) Prior Publication Data

US 2008/0081659 A1    Apr. 3, 2008

(30) Foreign Application Priority Data

Oct. 2, 2006    (KR) .................... 10-2006-0097152

(51) Int. Cl.
*H04B 1/00* (2006.01)
(52) U.S. Cl. .................... 455/434; 455/552.1; 455/574
(58) Field of Classification Search .............. 455/550.1, 455/574, 575.1, 127.1, 343.1, 343.2, 343.3, 455/434, 552.1; 375/131
See application file for complete search history.

(56) References Cited

U.S. PATENT DOCUMENTS

| 5,940,431 | A | * | 8/1999 | Haartsen et al. ............. 375/131 |
| 6,078,826 | A | * | 6/2000 | Croft et al. .................. 455/574 |
| 7,539,519 | B2 | | 5/2009 | Ko et al. |
| 2004/0166904 | A1 | * | 8/2004 | Kuo ........................... 455/574 |
| 2006/0105812 | A1 | | 5/2006 | Shin |
| 2007/0072578 | A1 | * | 3/2007 | Lee et al. ................. 455/343.1 |

FOREIGN PATENT DOCUMENTS

| CN | 1610422 | 4/2005 |
| CN | 1805578 | 7/2006 |
| JP | 2004-180297 | 6/2004 |
| JP | 2004-289756 | 10/2004 |
| JP | 2005-086738 | 3/2005 |
| JP | 2005-184367 | 7/2005 |
| KR | 1020020062409 | 7/2002 |
| KR | 1020040088660 | 10/2004 |
| KR | 1020050061984 | 6/2005 |
| KR | 1020060065094 | 6/2006 |
| KR | 1020060081962 | 7/2006 |

* cited by examiner

*Primary Examiner*—Thanh C Le
(74) *Attorney, Agent, or Firm*—The Farrell Law Firm, LLP

(57) ABSTRACT

A method and apparatus for saving power of a multi standby mobile terminal are provided that can reduce power consumption by limiting an unnecessary operation in a communication mode that does not perform a communication service in the multi standby mobile terminal. The method of saving power of a multi standby mobile terminal includes detecting whether a communication event is generated; acquiring, if a communication event is generated, a communication service; and operating the multi standby mobile terminal in a communication mode of the acquired communication service.

14 Claims, 3 Drawing Sheets

METHOD AND APPARATUS FOR SAVING POWER OF MULTI STANDBY MOBILE TERMINAL

PRIORITY

This application claims priority under 35 U.S.C. §119(a) to a Korean Patent Application entitled "METHOD AND APPARATUS FOR SAVING POWER OF MULTI STANDBY MOBILE TERMINAL" filed in the Korean Intellectual Property Office on Oct. 2, 2006 and assigned Serial No. 2006-0097152, the contents of which are hereby incorporated by reference.

BACKGROUND OF THE INVENTION

1. Field of the Invention

The present invention relates to a mobile terminal, and in particular, to a method and apparatus for saving power of a multi standby mobile terminal that can reduce power consumption of the multi standby mobile terminal for simultaneously supporting a multi standby mode.

2. Description of the Related Art

As mobile terminals become more widely used, mobile terminals that provide various functions have been developed. Today, dual mode mobile terminals can use at least two wireless communication networks.

A conventional mobile terminal that supports only one wireless communication system can communicate only in a service area of the corresponding wireless communication system. However, a dual mode mobile terminal can communicate in the corresponding service area of at least two wireless communication systems. For example, a dual mode mobile terminal that supports a Code Division Multiple Access (CDMA) system and a Global System for Mobile communication (GSM) system can communicate in service areas of both the CDMA system and the GSM system. Accordingly, the dual mode mobile terminal can be used more widely than a single mode mobile terminal.

However, in a conventional dual mode mobile terminal, because a system mode is converted by first booting the mobile terminal, then entering an idle mode, and then followed by manipulating a menu, the manipulation is complicated and much time is required for converting the mode.

In order to solve the problem, a dual standby mobile terminal has been developed that simultaneously supports both modes of the CDMA system and GSM system, unlike the conventional dual mode mobile terminal.

In view of the mobility of a mobile terminal, power consumption of the mobile terminal is an important factor. Accordingly, it is very important to design a wireless communication system that reduces the overall power consumption of the mobile terminal.

However, the dual standby mobile terminal is simultaneously supported by both the CDMA system and GSM system. Accordingly, even when the dual standby mobile terminal operates in only one of the service areas of the CDMA system or the GSM system, the mobile terminal can be supported by a network of only one mode of the CDMA system or the GSM system, or is not provided with a roaming service between the CDMA system and GSM system, the dual standby mobile terminal operates communication modules for both the CDMA system and GSM system.

As such, because the dual standby mobile terminal periodically attempts to acquire an unavailable system, power consumption thereof increases. However, in an existing dual standby mobile terminal, an efficient method of reducing power consumption is not provided.

SUMMARY OF THE INVENTION

The present invention has been made in an effort to solve the above problems, and an aspect of the present invention is to provide a method and apparatus that can control power consumption of a multi standby mobile terminal.

Another aspect of the present invention is to provide a method and apparatus for saving power of a multi standby mobile terminal that can reduce power consumption of the multi standby mobile terminal by converting a mode according to a service environment of a system in the multi standby mobile terminal.

Another aspect of the present invention is to provide a method and apparatus for saving power of a multi standby mobile terminal that can reduce power consumption of a multi standby mobile terminal by limiting an unnecessary operation of the multi standby mobile terminal according to a network by which the multi standby mobile terminal can be supported.

Another aspect of the present invention is to provide a method and apparatus for saving power of a multi standby mobile terminal that can increase a standby time and communication time of the multi standby mobile terminal by reducing power consumption of the multi standby mobile terminal.

According to one aspect of the present invention, there is provided a method of saving power of a multi standby mobile terminal. The method includes detecting if a communication event is generated; if a communication event is generated, acquiring a communication service; and operating the multi standby mobile terminal in a communication mode of the acquired communication service.

According to another aspect of the present invention, there is provided an apparatus for saving power of a multi standby mobile terminal. The apparatus includes first and second communication modules supporting the first and second communication services, respectively; and a common module for searching for a communication service according to a requested communication event, acquiring a connection with a communication service based on the search, and controlling connection to the acquired communication service using the first and second communication modules corresponding to the found communication service.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF PREFERRED EMBODIMENTS

Figure 1:
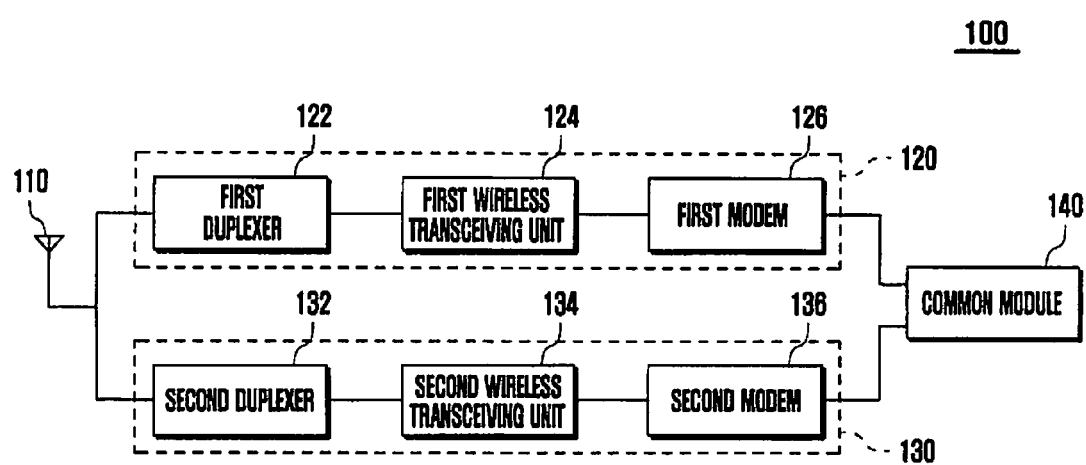
FIG. 1 is a block diagram illustrating a configuration of a multi standby mobile terminal according to an exemplary embodiment of the present invention.

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

While the present invention may be embodied in many different forms, specific embodiments of the present invention are shown in drawings and are described herein in detail, with the understanding that the present disclosure is to be considered as an exemplification of the principles of the invention and is not intended to limit the invention to the specific embodiments illustrated.

As a network in which a multi standby mobile terminal according to an exemplary embodiment of the present invention operates, a CDMA system and GSM system are provided. However, the network is not limited to the CDMA system and GSM system. The network according to an exemplary embodiment of the present invention includes the CDMA system and GSM system, a network for providing an Internet Protocol (IP)-based packet service to a subscriber as in a Wireless Local Area Network (wireless LAN) based on Institute of Electrical and Electronics Engineers (IEEE) 802.1x and IEEE 802.2x standards, and various other networks such as General Packet Radio Service (GPRS), Enhanced Data GSM Environment (EDGE), Universal Mobile Telecommunications System (UMTS), Wideband Code Division Multiple Access (WCDMA), Wireless Internet Platform for Interoperability (WIPI)(IEEE 802.11b), and 3GPP ($3^{rd}$ Generation Partnership Project), and can be applied to extended forms and modified forms of the described networks.

In order to clarify the essential points of the invention and for a better understanding, as a multi standby mobile terminal, a dual standby mobile terminal that can simultaneously connect to the CDMA system and GSM system is provided. However, a dual standby mobile terminal according to an exemplary embodiment of the present invention supports at a least dual standby mode including the CDMA system and GSM system.

Further, in the exemplary embodiment of the present invention, the multi standby mobile terminal is provided as a mobile communication terminal, but the present invention is not limited thereto. The multi standby mobile terminal according to the embodiment of the present invention is a terminal that can support the described multi standby mode communication service and can be applied to information communication devices such as a digital broadcasting terminal, a smart phone, an International Mobile Telecommunication 2000 (IMT-2000) terminal, a CDMA terminal, a WCDMA terminal, a GSM terminal, an Universal Mobile Telecommunication Service (UMTS) terminal, a cellular phone, and a wireless Internet support terminal, and applications thereof.

In an exemplary embodiment of the present invention, a method and apparatus for saving power of a multi standby mobile terminal are provided. For example, in an exemplary embodiment of the present invention, when a network connected by the multi standby mobile terminal supports only one of the CDMA system and GSM system or supports two systems (for example, CDMA system and GSM system) but cannot provide a roaming service between the CDMA system and the GSM system, an unnecessary operation of the multi standby mobile terminal is limited. Accordingly, power consumption of the multi standby mobile terminal can be reduced, whereby a standby time and communication time of the multi standby mobile terminal can be increased.

A configuration and a method of saving power of a multi standby mobile terminal according to an exemplary embodiment of the present invention are described with reference to the attached drawings.

FIG. 1 is a block diagram illustrating a configuration of a multi standby mobile terminal according to an exemplary embodiment of the present invention.

In FIG. 1, the multi standby mobile terminal 100 includes an antenna 110, a first communication module 120 for providing a first communication service (e.g. CDMA communication service), a second communication module 130 for providing a second communication service (e.g. GSM communication service), and a common module 140.

The antenna 110 can simultaneously process a frequency band for providing the first communication service and a frequency band for providing the second communication service. FIG. 1 shows one single antenna 110, but a dual antenna corresponding to both systems (e.g. CDMA system and GSM system) can be used.

The first communication module 120 for providing the first communication service includes a first duplexer 122 for operating as a a band pass filter for separating and processing each frequency, a first wireless transceiving unit 124 for separating transmitting and receiving electric waves into a predetermined frequency band, and a first modem 126 for processing a wireless protocol of the first communication system (e.g. CDMA system).

The second communication module 130 for providing the second communication service includes a second duplexer 132 for operating as a band pass filter for separating and processing each frequency, second wireless transceiving unit 134 for separating, transmitting and receiving electric waves into a predetermined frequency band, and a second modem 136 for processing a wireless protocol of the second communication system (e.g. GSM system).

The common module 140 operates as a central processing unit for controlling the first communication module 120 and second communication module 130, and a memory, input/output unit, controller, and other processors.

In operation, the common module 140 determines, when the receipt of a call is requested from a communication system or when a call connection to a predetermined communication system is requested by a user, whether to connect to a requested communication service. The common module 140 controls connection to the corresponding communication service using a communication module, for example, the first communication module 120 or the second communication module 130, corresponding to the requested communication service.

For example, when the multi standby mobile terminal 100 acquires only one of the first and second communication service, the common module 140 controls the connection to the communication service using the first communication module 120 or second communication module 130 that corresponds to the communication service. Further, when the multi standby mobile terminal 100 simultaneously acquires the first and second communication services, the common module 140 simultaneously controls connection to a communication service using the first and second communication modules 120 and 130. If a requested communication module is selected by a preset method after the multi standby mobile terminal 100 acquires a communication service using the first and second communication modules 120 and 130, it is preferable to limit the connection to a communication service that uses an unselected communication module.

The common module 140 controls the operation of the first and second communication modules 120 and 130 according to a state of a communication service corresponding to the acquired communication system.

As shown in FIG. 1, the multi standby mobile terminal 100 includes the first communication module 120 and second communication module 130. The first communication module 120 and second communication module 130 provide a first communication interface (for example, CDMA communication interface) and second communication interface (for example, GSM communication interface) so that the multi standby mobile terminal 100 may communicate with the first communication system and second communication system via control of the common module 140.

The multi standby mobile terminal 100 according to an exemplary embodiment of the present invention supports at least two communication connection modes.

The multi standby mobile terminal 100 enters a multi standby mode by simultaneously activating the first communication module 120 and second communication module 130 when power is turned on. The multi standby mobile terminal 100 can simultaneously process a call received through the first and second communication systems.

The multi standby mobile terminal 100 can perform a communication service through the corresponding communication system by processing the transmission and reception of a call through either the first communication module 120 or second communication module 130 according to a preset preference communication system mode.

The multi standby mobile terminal 100 is controlled to adaptively operate according to a communication service provided through either the first communication module 120 or second communication module 130, or to simultaneously operate in a communication service provided through the first communication module 120 and second communication module 130, so that the multi standby mobile terminal 100 can perform a communication service through the corresponding communication system (for example, any one of the CDMA communication system and GSM communication system). A mode of the multi standby mobile terminal 100 can be set by a user interface, for example a menu "Single Mode Selection" provided by the multi standby mobile terminal 100, or can be set to be automatically changed. An illustration of a "Single Mode Selection" menu is shown in Table 1 below.

TABLE 1

| Single Mode Selection |
|---|
| ● Automatic |
| ○ Dual Mode |

In Table 1, a user of the multi standby mobile terminal 100 can set a communication service mode through the menu "Single Mode Selection."

Also, in Table 1, "Automatic" indicates a case set to operate the multi standby mobile terminal 100 in an available communication service mode among communication services that can be acquired by the multi standby mobile terminal 100. In Table 1, "Dual Mode" indicates a case set to simultaneously operate the multi standby mobile terminal 100 in two modes of a communication service, for example, a CDMA communication service and a GSM communication service that can be supported by the multi standby mobile terminal 100 regardless of another kind of communication services that can also be acquired by the multi standby mobile terminal 100.

The multi standby mobile terminal 100 can be operated by selecting an operation mode as shown in either Table 2 or 3 according to the communication system acquired by the setting of "Single Mode Selection." For example, the common module 140 controls at least one of the first communication module 120 and second communication module 130 according to the setting of "Single Mode Selection" and can reduce power consumption by controlling an operation of the first communication module 120 or second communication module 130 as shown in Tables 2 and 3 according to a state of the acquired communication system and to the selected mode.

TABLE 2

| Acquired system state | | Operation | |
|---|---|---|---|
| CDMA | GSM | CDMA | GSM |
| Home or Roaming | Home or Roaming | On Line | On Line |
| Home or Roaming | No Service | On Line | Off Line |
| Home or Roaming | Limited | On Line | Off Line |
| No Service | Home or Roaming | Off Line | On Line |
| No Service | No Service | Searching | Searching |
| No Service | Limited | Searching | Searching |
| Negative or Unknown | Home or Roaming | Off Line | On Line |
| Negative or Unknown | No Service | Searching | Searching |
| Negative or Unknown | Limited | Searching | Searching |

Table 2 shows an operation example of a case where the system mode is set to "Automatic" so that the multi standby mobile terminal 100 operates in an available service mode according to a system state (for example, a kind of a service) acquired by the first communication module 120 and second communication module 130 in the setting of "Single Mode Selection".

TABLE 3

| Acquired system state | | Operation | |
|---|---|---|---|
| CDMA | GSM | CDMA | GSM |
| Home or Roaming | Home or Roaming | On Line | On Line |
| Home or Roaming | No Service | On Line | Searching |
| Home or Roaming | Limited | On Line | Searching |
| No Service | Home or Roaming | Searching | On Line |
| No Service | No Service | Searching | Searching |
| No Service | Limited | Searching | Searching |
| Negative or Unknown | Home or Roaming | Searching | On Line |
| Negative or Unknown | No Service | Searching | Searching |
| Negative or Unknown | Limited | Searching | Searching |

Table 3 shows an example of a case where the system mode is set to "Dual Mode" so that the multi standby mobile terminal 100 operates in an available service mode regardless of a system state (for example, a kind of a service) acquired by the first communication module 120 and second communication module 130 in the setting of the "Single Mode Selection".

As shown in Tables 2 and 3, "Home or Roaming" indicates a case where the multi standby mobile terminal 100 acquires the corresponding communication system (for example, a CDMA or GSM communication system) for providing an available first or second communication service. For example, "Home or Roaming" indicates a case of acquiring an available system in a Preferred Roaming List (PRL) of the CDMA system or of acquiring an available system in a Public Land Mobile Network (PLMN) of the GSM system.

"No Service" indicates a case where the multi standby mobile terminal 100 cannot acquire a communication system for providing the first and second communication services. That is, "No Service" indicates a case where a communication service is not available.

"Negative or Unknown" indicates a case where the multi standby mobile terminal 100 acquires a system registered as a negative system in the PRL in the first communication system (e.g. CDMA system) or a system that does not exist in the PRL.

"Limited" indicates a case where the multi standby mobile terminal 100 acquires a forbidden PLMN in the second communication system (e.g. GSM system).

Particularly, in an exemplary embodiment of the present invention, as shown in Table 2, the multi standby mobile terminal 100 can efficiently reduce power consumption thereof by adaptively controlling an operation thereof according to a state, i.e. "Home or Roaming", "No Service", "Negative or Unknown", or "Limited", of a communication system acquired by the first communication module 120 and second communication module 130.

Specifically, when the service mode is set to "Automatic" in the setting of "Single Mode Selection", the multi standby mobile terminal 100 controls the first communication module 120 or second communication module 130 to operate in the case of "Home or Roaming" and limits an unnecessary operation of the first communication module 120 or second communication module 130 in the case of "No Service". When the state of a system acquired by the first communication module 120 and second communication module 130 is "No Service," it is preferable to search for an available communication service by operating the first communication module 120 and second communication module 130.

Further, in the case of "Negative or Unknown," an unnecessary operation of the first communication module 120 is limited, and in the case of "Limited," an unnecessary operation of the second communication module 130 is limited. In the case where the state of a system acquired by the first communication module 120 is "Negative or Unknown" and the state of a system acquired by the second communication module 130 is "Limited", the case where the state of a system acquired by the first communication module 120 is "Negative or Unknown" and the state of a system acquired by the second communication module 130 is "No Service", and the case where the state of a system acquired by the first communication module 120 is "No Service" and the state of a system acquired by the second communication module 130 is "Limited", it is preferable to search for an available communication service by operating the first communication module 120 and second communication module 130.

As described above, in an exemplary embodiment of the present invention, a CDMA/GSM dual standby mobile terminal for supporting a CDMA system and GSM system as a supporting communication system is provided. However a dual standby mobile terminal according to the present invention is not limited to the CDMA/GSM dual standby mobile terminal. Here, the dual standby mobile terminal according to the present invention can be applied to a multi standby mobile terminal that can support a communication service of both a communication system that currently provides a communication service and a communication system that provides a communication service in the future.

A method of reducing power consumption of a multi standby mobile terminal according to an exemplary embodiment of the present invention will be described. The present invention is not limited to the following description but can be applied to various embodiments.

Figure 2A:
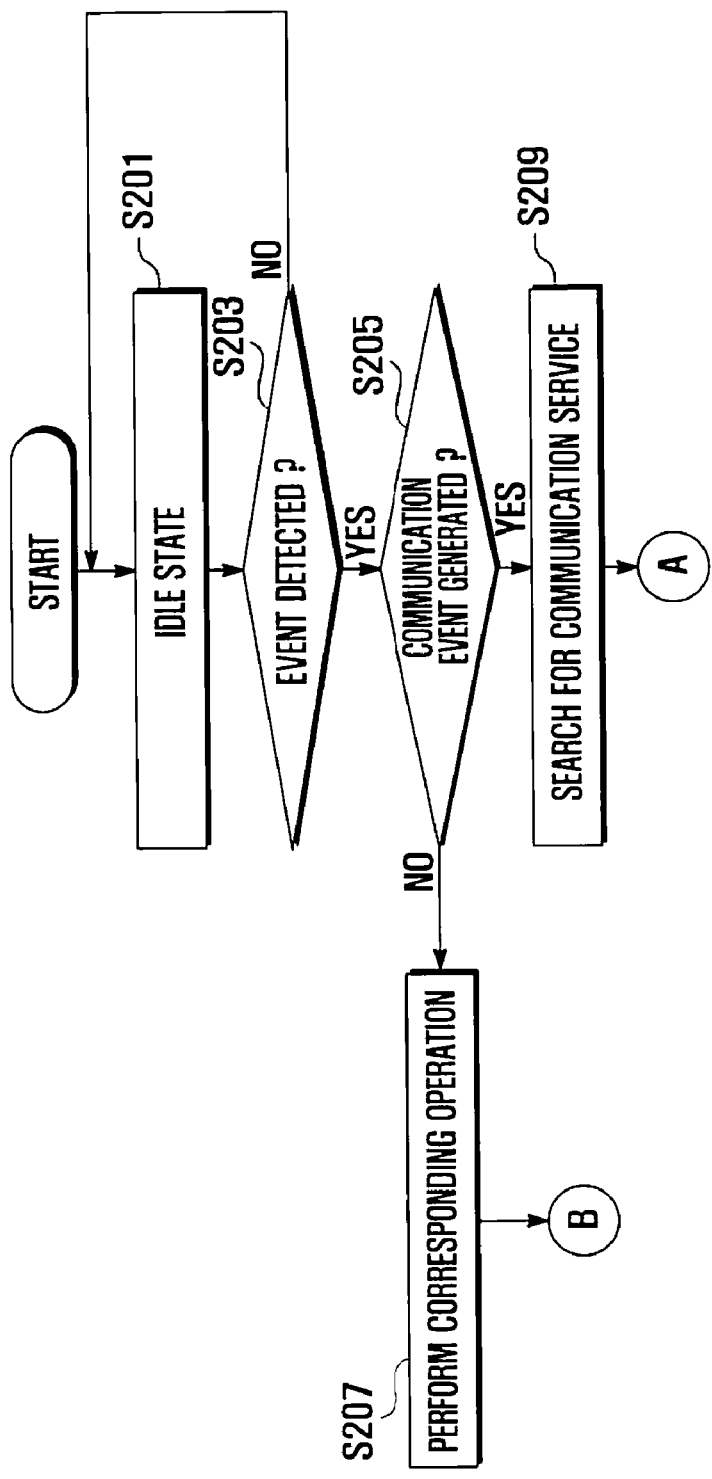
FIG. 2A to 2B are flow diagrams illustrating a method of saving power of a multi standby mobile terminal according to an exemplary embodiment of the present invention.
Figure 2B:
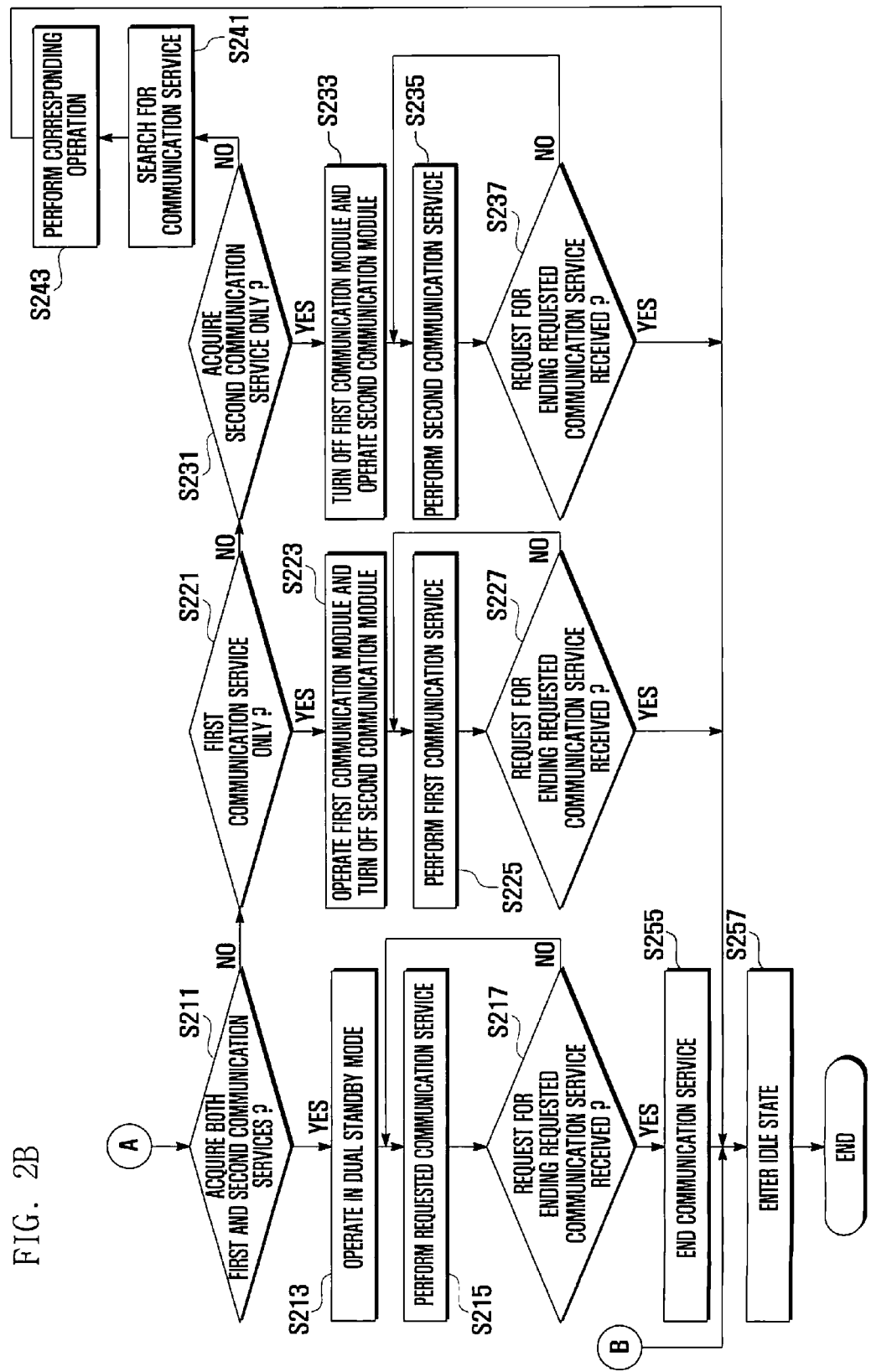

FIGS. 2A and 2B are flow diagrams illustrating a method of saving power of a multi standby mobile terminal according to an exemplary embodiment of the present invention. The multi standby mobile terminal 100 is referred to as a "the mobile terminal 100."

In FIGS. 2A and 2B, the mobile terminal 100 in an idle state in step S201 detects whether an event is generated in step S203. If an event is detected, the mobile terminal 100 determines whether the event is a communication event in step S205. The communication event includes a request (for example, call transmission) for connecting to a communication system for using a communication service by a user and a request (for example, call receipt) for using a communication service from the communication system.

If the event is not a communication event, the mobile terminal 100 performs the corresponding operation in step S207. For example, the mobile terminal 100 can execute a general additional function of the mobile terminal 100 requested by the user.

If the event is a communication event, the mobile terminal 100 searches for a communication system that provides a service according to the communication event in step S209. The mobile terminal 100 searches for a communication system (e.g. CDMA system or GSM system) for performing the communication service in step S209. That is, the mobile terminal 100 attempts to connect to each communication system for performing a communication service by operating a first communication module (e.g. CDMA communication module) and second communication module (e.g. GSM communication module).

When the mobile terminal 100 acquires at least one communication service through the search of the communication service in step S209, the mobile terminal 100 can perform a communication service using the corresponding communication module.

The mobile terminal 100 determines whether it can acquire both of the first communication service (e.g. CDMA communication service) and second communication service (e.g. GSM communication service) through the search at step S209 in step S211. Accordingly, if the mobile terminal 100 can acquire both of the first and second communication services at step S211, the mobile terminal 100 is operated in a dual standby mode in step S213. The mobile terminal 100 operates both of the first communication module 120 for connecting to a communication service of the first communication system and the second communication module 130 for connecting to a communication service of the second communication system.

The mobile terminal 100 performs the corresponding communication service requested by the user during operating in a dual standby mode by the first and second communication modules 120 and 130 at step S213 in step S215. When the mobile terminal 100 simultaneously acquires each communication service by the first and second communication modules 120 and 130, the mobile terminal 100 displays an inquiry as to whether to attempt to connect (e.g. connect to a CDMA mode) to the first communication module 120 or whether to attempt to connect (e.g. connect to a GSM mode) to the second communication module 130 through, for example, a pop-up message. Thereafter, the mobile terminal 100 attempts to connect to the corresponding communication system using a communication module selected according to a key input signal for selecting a connection system to be input by the user in response to the inquiry. Further, when the mobile terminal 100 is connected to the corresponding communication system through the communication module selected by the user, the power consumption, due to the unnecessary operation of the communication module, can be reduced when turning off the unselected communication module.

While performing the requested communication service, the mobile terminal 100 determines whether a request for ending the requested communication service is received in step S217 and, if such a request is not received, the process returns to step S215 and the mobile terminal 100 continues to perform the requested communication service.

If, however, the mobile terminal 100 cannot acquire both of the first and second communication services at step S211, the mobile terminal 100 determines if the first communication service can be acquired through the search at step S209 in step S221. If the mobile terminal 100 can acquire the first communication service at step S221, the mobile terminal 100 is operated in the first communication mode in step S223. In the mobile terminal 100, the first communication module 120 for connecting to a communication service of the first communication system is operated and the second communication module 130 for connecting to a communication service of the second communication system is turned off. As a result, by turning off a communication module that does not operate, power consumption of the mobile terminal 100 can be advantageously reduced.

The mobile terminal 100 performs a communication service by connecting to the first communication system through the first communication module 120 in step S225.

While performing the first communication service, the mobile terminal 100 determines whether a request for ending the first communication service is received in step S227 and, if such a request is not received, the process returns to step S225 and the mobile terminal 100 continues to perform the first communication service.

If the mobile terminal 100 cannot acquire the first communication service, the mobile terminal 100 determines if the second communication service can be acquired through the search at step S209 in step S231. If the mobile terminal 100 can acquire the second communication service at step S231, the mobile terminal 100 is operated in the second communication mode in step S233. In the mobile terminal 100, the second communication module 130 for acquiring a communication service of the second communication system is operated and the first communication module 120 for acquiring a communication service of the first communication system is turned off. Consequently, by turning off a communication module that does not operate, power consumption of the mobile terminal 100 can be reduced.

The mobile terminal 100 performs a communication service by connecting to the second communication system through the second communication module 130 in step S235.

While performing the second communication service, the mobile terminal 100 determines whether a request for ending the second communication service is received in step S237 and, if such a request is not received, the process returns to step S235 and the mobile terminal 100 continues to perform the second communication service.

When a communication system is searched for performing a communication service at step S209, the mobile terminal 100 may not acquire a communication service through any of the first and second communication modules 120 and 130.

For example, the mobile terminal 100 may fail to connect to the first communication system using the first communication module 120 and the second communication system using the second communication module 130 at steps S211, S221 and S231. Here, it is preferable that the mobile terminal 100 searches for a communication service, i.e. attempts to connect to a communication system for a predetermined number of times in step S241.

The mobile terminal 100 performs the corresponding operation in step S243. For example, if the mobile terminal 100 fails to connect to a communication system in spite of connection attempts for the predetermined number of times, the mobile terminal 100 controls a subsequent operation thereof by a user by outputting a notification message. If at least one communication service is discovered during connection attempts of the predetermined number of times, the mobile terminal 100 acquires the communication service by proceeding to step S211.

If a request for ending the corresponding communication service is received at step S217, S227 or S237, the mobile terminal 100 ends the corresponding communication service in step S255 and enters an idle state in step S257.

In a communication mode in which a communication service is not searched, the mobile terminal 100 can reduce power consumption by turning off the corresponding communication module. Because the mobile terminal 100 should search to determine if a signal transmitted from a communication system using a communication mode in which an operation is limited exists, it is preferable that the mobile terminal 100 periodically checks a transmission signal from the communication system. Otherwise, when a communication service is performed through a specific communication module, it is preferable that the mobile terminal 100 is operated in a multi standby mode by automatically turning on turned-off communication modules. The mobile terminal 100 can be embodied to output a notification message for notifying the status of the communication module to a user.

As described above, according to a method and apparatus for saving power of a multi standby mobile terminal, the power consumption of a multi standby mobile terminal which simultaneously supports at least two communication systems can be efficiently reduced. For example, according to the present invention, the power consumption of a multi standby mobile terminal can be reduced by adaptively converting to at least one communication mode according to a service environment of a system in the multi standby mobile terminal.

Furthermore, the power consumption of a multi standby mobile terminal can be reduced by limiting the operation of a communication module that is not in use according to a type of communication service acquired by the multi standby mobile terminal. Accordingly, a standby time and communication time of the multi standby mobile terminal can be increased.

Although exemplary embodiments of the present invention have been described in detail hereinabove, it should be clearly understood that many variations and modifications of the basic inventive concepts herein taught that may appear to those skilled in the present art will still fall within the spirit and scope of the present invention, as defined in the appended claims.

What is claimed is:

1. A method of saving power of a multiple standby mobile terminal including a first and a second communication module that are controlled by a common module, comprising:

detecting if a communication event is generated;

if a communication event is generated, acquiring a communication service corresponding to the generated communication event; and operating at least one of the first and second communication modules of the multiple standby mobile terminal in a communication mode of the acquired communication service, wherein the communication event is a call transmission or a call reception.

2. The method of claim 1, further comprising, when the multiple standby mobile terminal acquires one communication service based on the generation of the communication event, operating the multiple standby mobile terminal in only one communication mode corresponding to the communication service.

3. The method of claim 1, further comprising, when the multiple standby mobile terminal acquires at least two communication services based on the generation of the communication event, operating the multiple standby mobile terminal in at least two communication modes corresponding to the communication services.

4. The method of claim 3, further comprising, when any one communication mode is selected and a communication service of the communication mode is used after the multiple standby mobile terminal is operated in at least two communication modes, limiting the operation of the multiple standby mobile terminal in a communication mode that is not selected.

5. The method of claim 1, wherein the communication event comprises a call reception event requested from a communication system that can be connected to by the multi standby mobile terminal.

6. The method of claim 5, further comprising:

receiving the call in a communication mode corresponding to a communication system requesting the call; and limiting operation of the multi standby mobile terminal in other communication modes.

7. The method of claim 1, wherein the communication event comprises a call connection event for attempting to connect to a communication system that can be connected to by the multi standby mobile terminal.

8. The method of claim 6, further comprising:

searching for a communication system to connect the call;

connecting the call in a communication mode based on the search results; and limiting operation of the multi standby mobile terminal in other communication modes.

9. The method of claim 1, wherein acquiring a communication service comprises:

detecting a state of the acquired communication service; and limiting operation of the multi standby mobile terminal in a communication mode according to a state of the communication service.

10. The method of claim 9, wherein acquiring a communication service further comprises:

if at least two communication services are acquired, detecting a state of each communication service; and limiting operation of the multi standby mobile terminal in a communication mode corresponding to each communication service according to a state of the corresponding communication service.

11. The method of claim 10, wherein detecting a state of the communication service comprises:

when the first and second communication services are in an available state, operating the multi standby mobile terminal in the first and second communication modes and connecting to a requested communication service;

when only the first communication service is in an available state, operating the multi standby mobile terminal in the first communication mode and connecting to the first communication service;

when only the second communication service is in an available state, operating the multi standby mobile terminal in the second communication mode and connecting to the second communication service; and when the first and second communication services are in an unavailable state, operating the multi standby mobile terminal in the first and second communication modes and searching for an available communication service.

12. The method of claim 11, further comprising when the first and second communication services are in a state that cannot be connected to, operating the multi standby mobile terminal in a communication mode and continuously searching for an available communication service.

13. The method of claim 1, further comprising:

when the communication service is in an available state, operating the multi standby mobile terminal in a corresponding communication mode; and when the communication service is in an unavailable state, limiting the operation of the multi standby mobile terminal in a corresponding communication mode.

14. The method of claim 13, further comprising when the communication service is in a state that can be used but cannot be acquired searching, for an available communication service.

* * * * *